May 26, 1925. 1,538,976
F. S. DENNEEN ET AL
CLUTCH
Filed Nov. 4, 1920 5 Sheets-Sheet 3
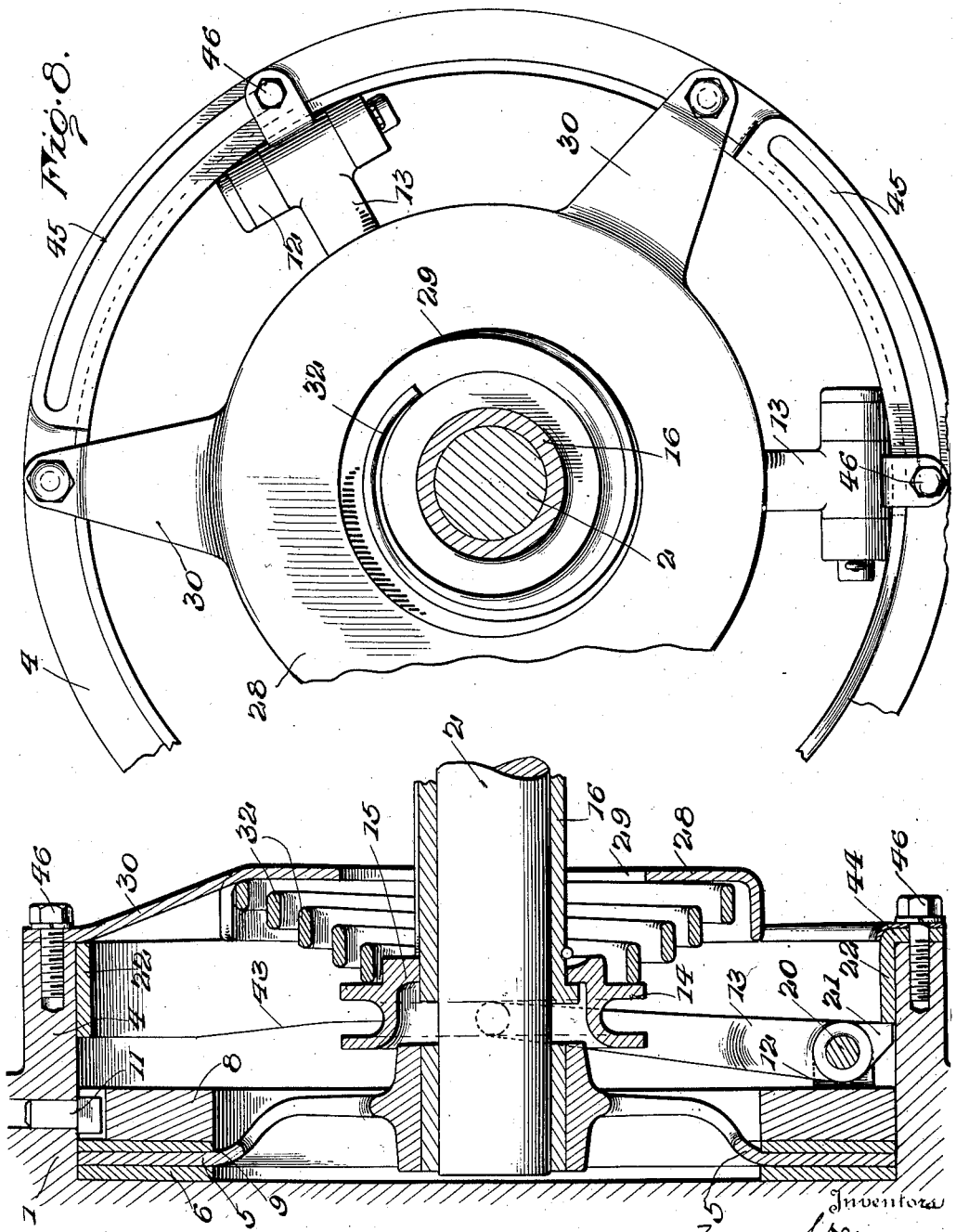

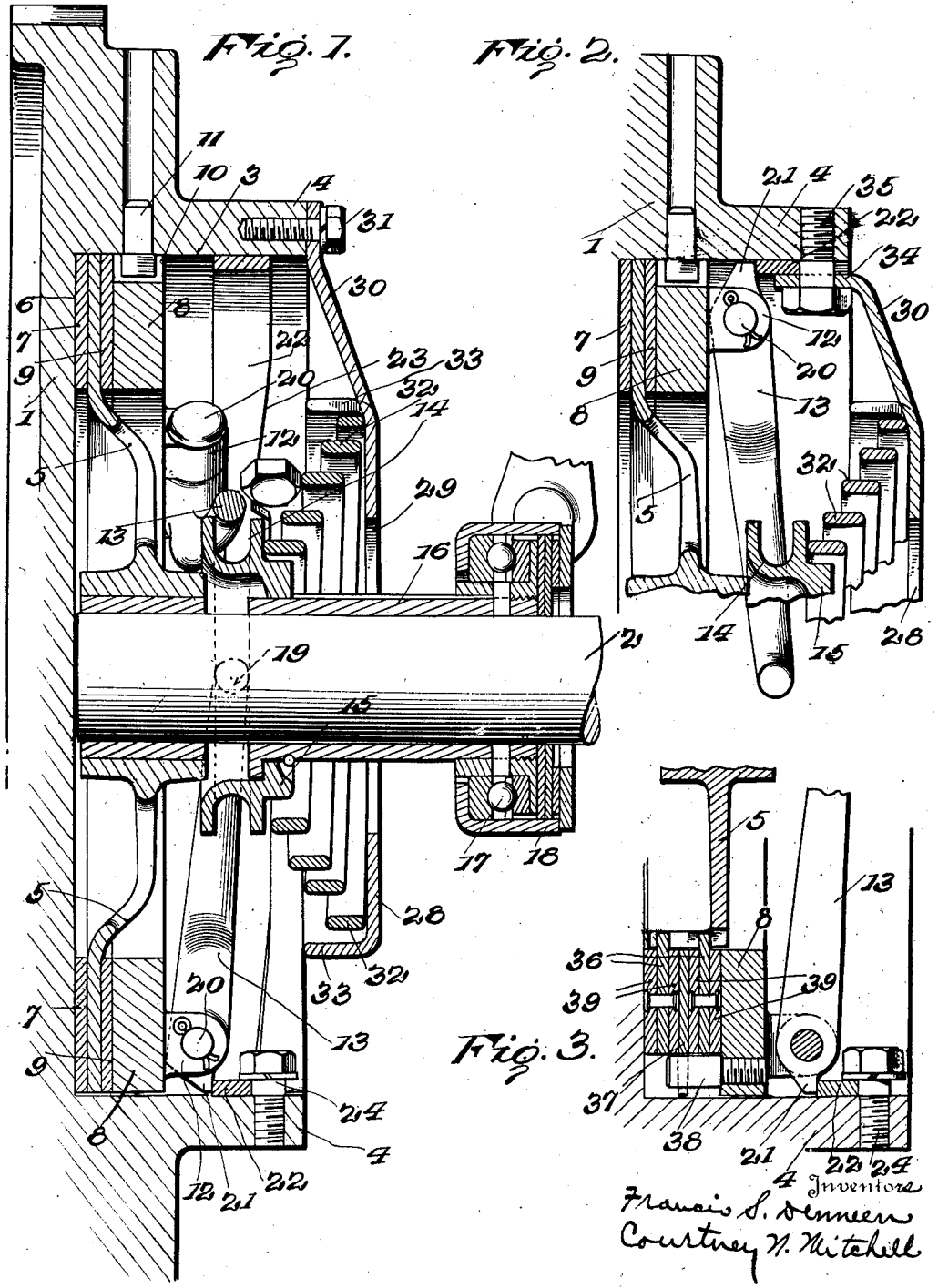

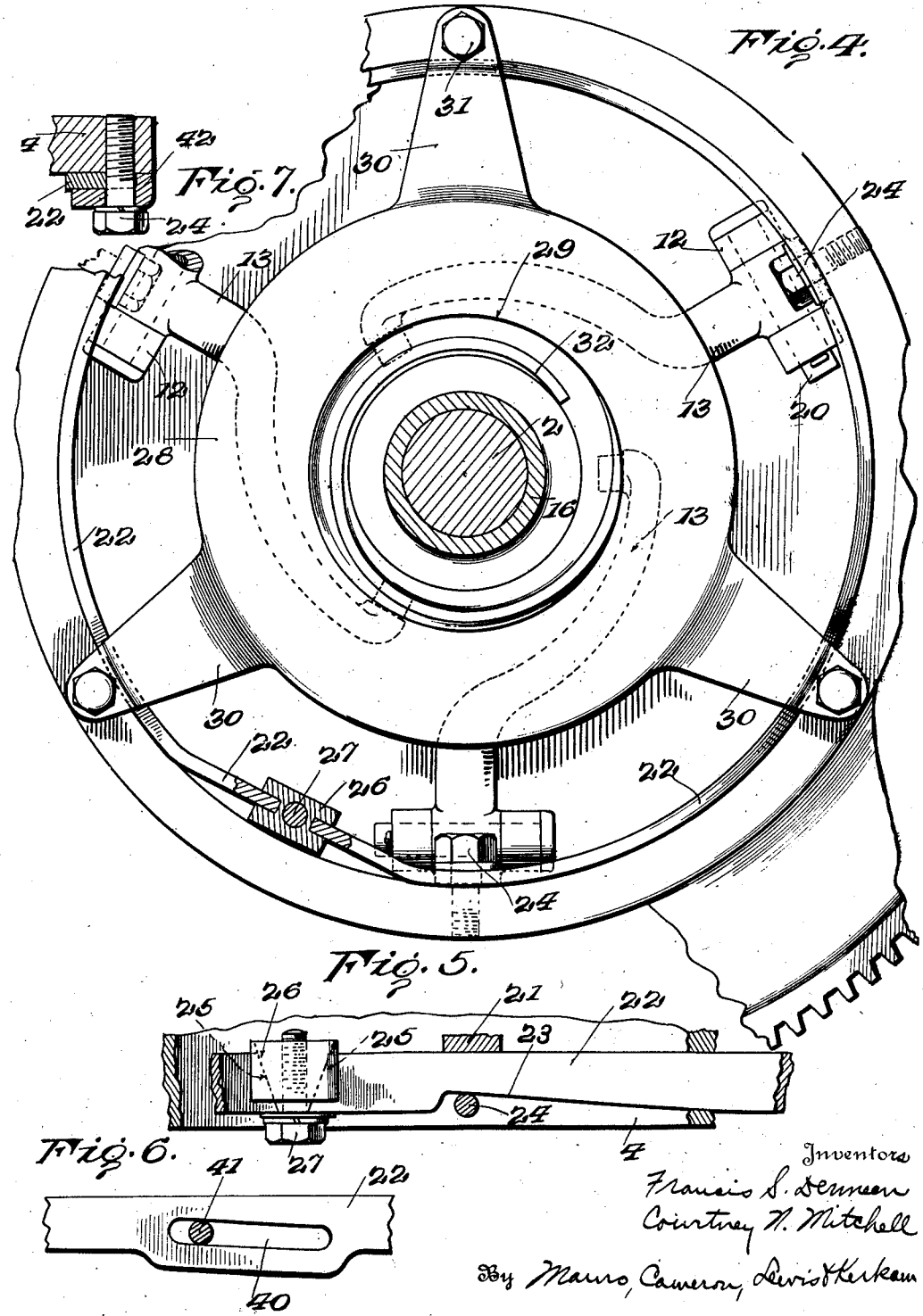

May 26, 1925.
F. S. DENNEEN ET AL
CLUTCH
Filed Nov. 4, 1920
1,538,976
5 Sheets-Sheet 4
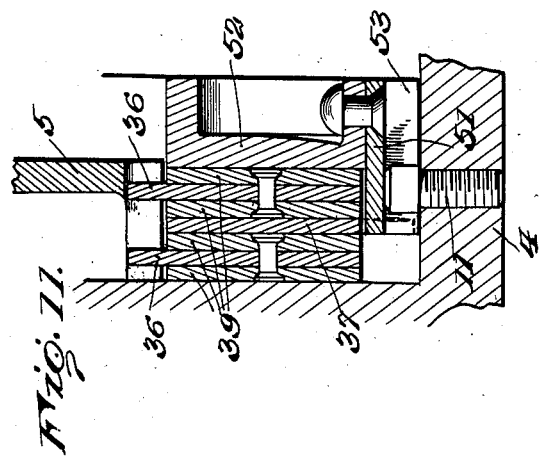
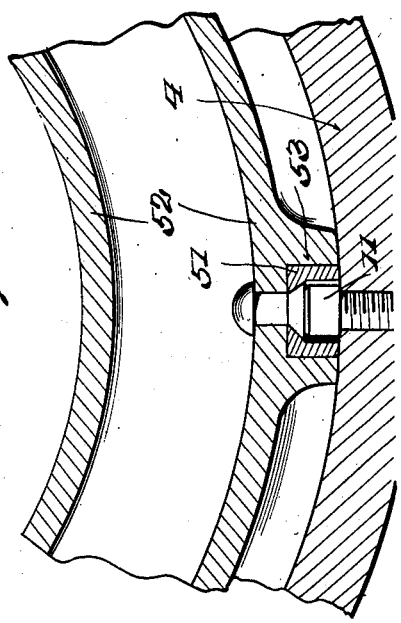
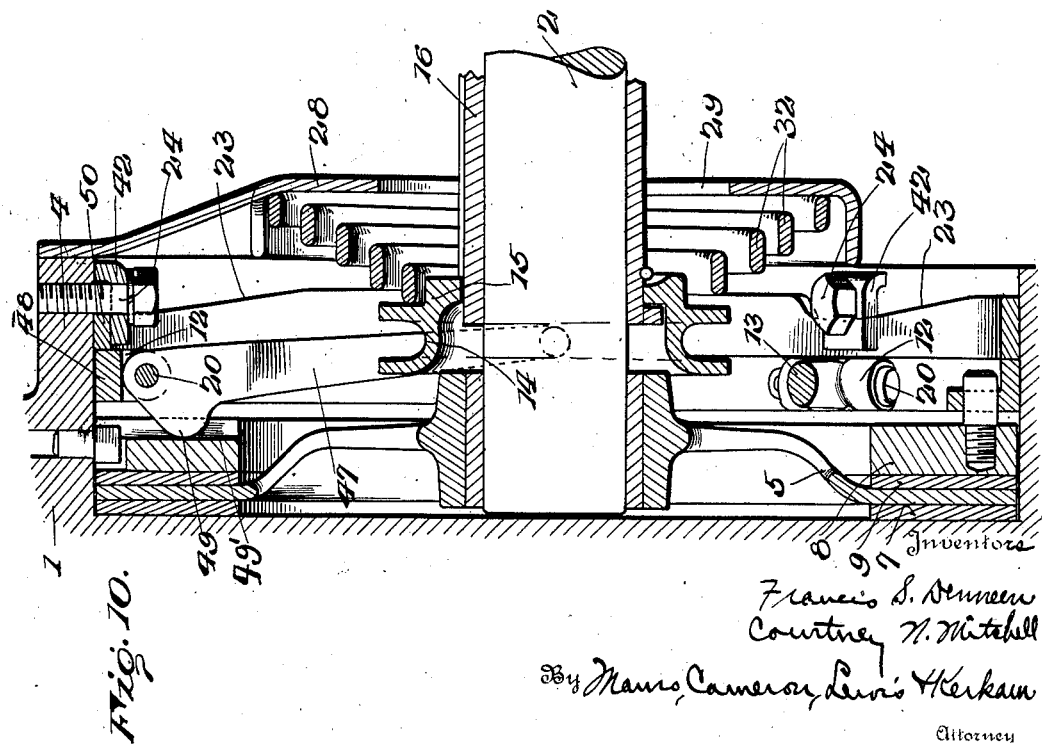

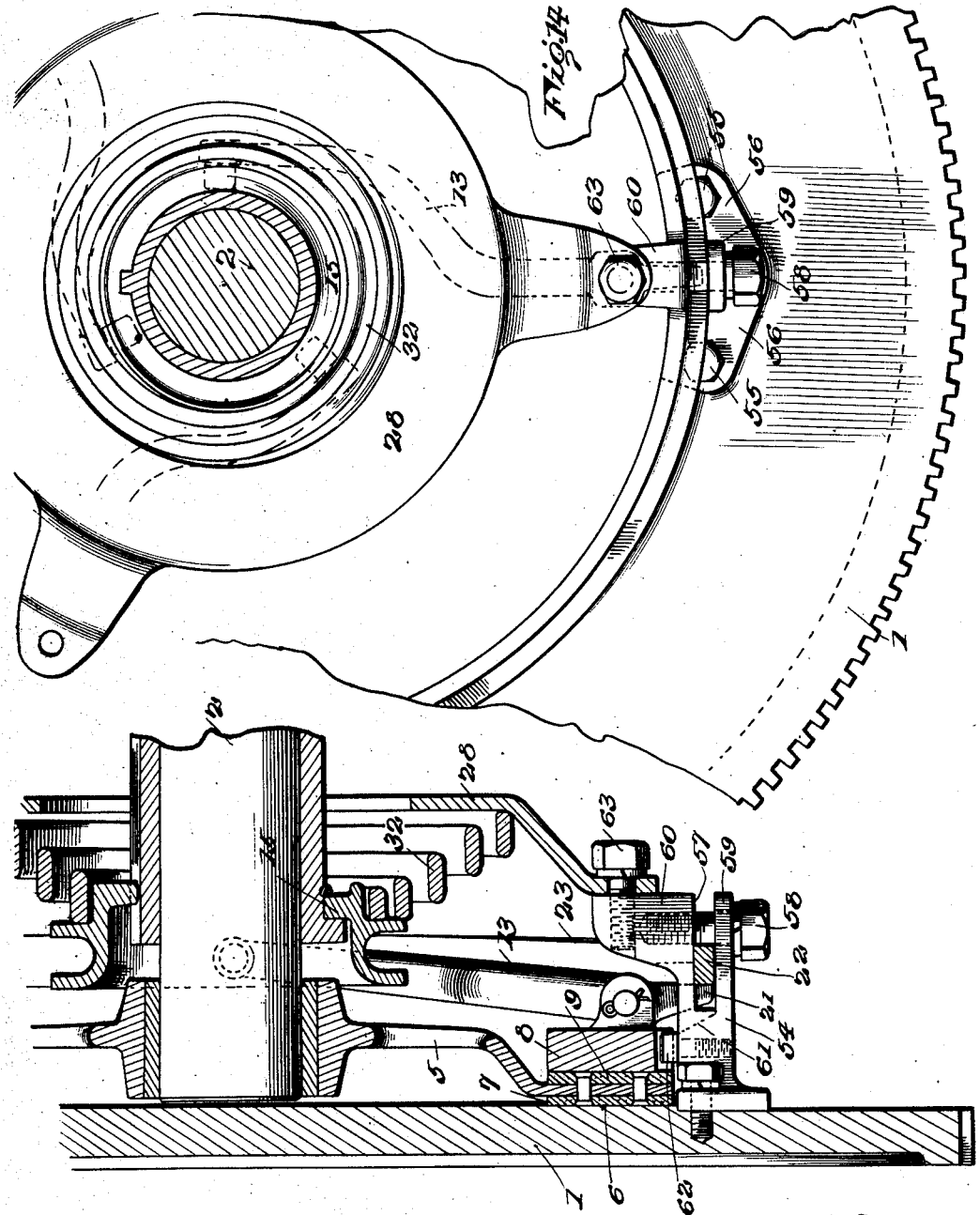

Patented May 26, 1925.

1,538,976

UNITED STATES PATENT OFFICE.

FRANCIS S. DENNEEN AND COURTNEY N. MITCHELL, OF CLEVELAND, OHIO.

CLUTCH.

Application filed November 4, 1920. Serial No. 421,747.

*To all whom it may concern:*

Be it known that we, FRANCIS S. DENNEEN and COURTNEY N. MITCHELL, citizens of the United States, and residents of Cleveland, Ohio, have invented new and useful Improvements in Clutches, which invention is fully set forth in the following specification.

This invention relates to clutches and, while capable of use in a wide variety of clutches, has particular utility when embodied in clutches for motor cars and similar uses.

It has heretofore been proposed to provide a clutch, comprising driving and driven elements having cooperating clutch members, with a plurality of levers for operating said clutch members and means to adjust said levers to take up for wear of said clutch members, said clutch parts being provided with a cover for mounting and retaining the same in operative relationship. Clutches of this type have the disadvantage that the clutch parts are not readily accessible, as they can be reached only by removal of the cover and the consequent dismantling of the clutch. It is an object of this invention to provide an improved clutch wherein the means for adjusting the clutch actuating levers is mounted independently of any cover or closure member for the clutch parts, said means preferably being mounted directly on one of said elements.

Clutches of the above type as heretofore constructed, moreover, have the disadvantage that the clutch members are not readily cooled, that the cover has to be entirely removed and some or all of the clutch parts disassembled whenever the clutch is to be cleaned out, and that adjustment of the clutch parts is rendered difficult through inability to inspect the same during adjustment. It is an object of this invention to provide an improved clutch of the type indicated which is so constructed as to facilitate air cooling of the clutch members, to enable the clutch to be washed or blown out without removal of any of the clutch parts, and to permit the ready inspection of the clutch parts during adjustment or at other times.

It has also been proposed to provide a clutch of the type indicated with an adjustable ring on which the clutch-actuating levers fulcrum, whereby wear of the clutch members can be compensated by axial adjustment of the fulcrum points of said levers. It is an object of this invention to provide improved means for adjusting the clutch-actuating levers of a clutch of this type, whereby the construction is simplified and adjustment facilitated.

Another object of this invention is to provide a clutch of the type characterized which is made up of simple parts whereby inexpensive forgings and stampings may be used and intricate and expensive castings and forgings avoided, and one which moreover does not necessitate expensive machining or highly skilled labor when constructing or assembling the same.

Another object of this invention is to provide a clutch of the type characterized which is composed of a minimum number of simple parts, which is light in weight whereby the same may be readily balanced, and wherein the stresses are taken by parts which are strong and durable and therefore not easily broken.

Other objects will appear as the description of the invention proceeds.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

In said drawings, wherein the same reference characters are employed to designate corresponding parts in the several figures,—

Fig. 1 is an axial section of a clutch embodying the present invention.

Fig. 2 is a partial axial section of another arrangement embodying the present invention.

Fig. 3 is a partial axial section of still another arrangement embodying the present invention.

Fig. 4 is a rear elevation, partially broken away, of the clutch shown in Fig. 1.

Fig. 5 is a detail illustrating one means for locking the adjustable ring in position as well as one manner of axially adjusting the fulcrum points of the levers.

Fig. 6 is a fragmentary detail of another means by which the fulcrum points of the levers may be adjusted axially.

Fig. 7 is a fragmentary detail illustrating another manner of clamping the adjustable ring in position.

Figs. 8 and 9 are respectively a partial rear elevation and an axial section of another embodiment of the present invention.

Fig. 10 is an axial section of still another embodiment of the present invention.

Figs. 11 and 12 are fragmentary details of another arrangement which may be employed in conjunction with the present invention.

Figs. 13 and 14 are respectively a partial axial section and a partial rear elevation of another embodiment of the present invention.

In the form shown in Figs. 1 and 4, 1 is the driving element, for example a fly wheel on the engine shaft, and 2 is the driven element, for example a shaft in the usual transmission. Said driving element may be provided with a recess 3 to constitute a housing 4 for the clutch members, but such is not necessary as no housing need be provided.

Suitably keyed or otherwise fixed to the driven element or shaft 2 is a clutch member 5 which cooperates with a clutch member or face 6 formed on or suitably connected with the driving element 1. A ring 7 of friction material is preferably interposed between the cooperating clutch members 5 and 6. A pressure ring 8, between which and the clutch member 5 a second friction ring 9 is preferably interposed, is keyed to rotate with the driving element 1 in any suitable way. In the form shown, one or more slots 10 are provided in the periphery of said pressure ring and cooperating pins 11 are suitably mounted, as in apertures in the wall of the driving element 1, with their heads in driving engagement with said slots. While the cooperating clutch members are shown in Fig. 1 as of the single disk type, said clutch members may be of the multiple disk type as hereinafter explained.

Pivotally mounted on said pressure ring 8, as by lugs 12 carried thereby, are a plurality of clutch-actuating levers 13. Any suitable number of levers may be employed, three being illustrated at 120° apart. Said levers extend inwardly tangentially of the shaft 2 and their inner ends are operatively engaged in the groove 14 of a lever-shifting collar 15 keyed or otherwise suitably connected to a clutch-shifting sleeve 16. At its opposite end, said sleeve 16 has a ball bearing 17 with a clutch-shifting yoke 18 of any suitable construction. Said levers 13 are preferably provided with cylindrical ends 19 for engagement in said groove 14.

Said levers 13 extend beyond their pivot pins 20 and are provided with fulcrum portions 21 for engagement with an adjustable fulcrum ring 22 which is preferably provided with an edge, for engagement with said fulcrum portions, at right angles to the axis of the clutch members. In accordance with the present invention, said adjustable fulcrum ring 22 is so constructed and mounted that rotation of the same with respect to the clutch members effects an axial adjustment of the fulcrum points of the levers 13. Said provision for axial adjustment of the fulcrum points may be effected in a variety of ways. In the form shown in Figs. 1 and 5, the outer edge of said ring 22 is provided with a plurality of axially inclined edges 23, and a plurality of threaded studs 24 are mounted on the driving element and engaged by said axially inclined edges 23. Rotation of said ring 22 with respect to said studs 24 therefore effects an axial displacement of the ring 22 owing to the coaction of the cam edges 23 with said studs 24. In the preferred embodiment of the invention said ring 22 is provided with as many inclined surfaces 23 as there are levers 13 and the fulcrum portions 21 of said levers engage said ring 22 opposite the studs, 24, as diagrammatically illustrated in Fig. 5. Any suitable means may also be provided for retaining the ring 22 in adjusted position. In the form shown in Figs. 4 and 5, the ring 22 is split and provided with beveled edges 25 with which coacts a beveled block 26 that may be drawn inwardly to expand the ring 22 by a bolt 27 having threaded engagement with said block.

The clutch members may be provided, although not necessarily, with a closure member having a plurality of apertures through which air may readily circulate, the clutch members be blown or washed out, and inspection and adjustment of the clutch parts facilitated. Said member when provided may take a variety of forms and be mounted in a variety of ways. It preferably takes the form of a spider 28 having a central aperture 29, through which the shaft 2 extends, and a plurality of arms 30 which are suitably attached to the driving element, as by screws 31 which extend through the extremities of said arms into the periphery of the driving element. To normally urge the clutch actuating levers 13 into clutch-operating position, a spring 32 is mounted in operative relation to the lever-shifting collar 15 and has a tendency to move the same toward the left as viewed in Fig. 1. Said spring also functions in the form shown to maintain the fulcrum portions 21 of the levers 13 in engagement with the ring 22 and to urge said ring 22 into engagement with the studs 24 to prevent rattling of the parts. Said spring 32 may be retained in position by the spider 28, which operates as an abutment for the outer end of said spring, and said spider may then be provided with an inwardly directed circular flange 33 which operates to center said spring.

In operation, the driving element rotates the clutch member 6 and, owing to the interposed pins 11, drives the pressure ring 8, levers 13, collar 15 and sleeve 16, as well as the spider 28 attached thereto, the fulcrum ring 22, and the associated parts. The collar 15 is urged toward the left, as viewed in Fig. 1, by the spring 32 and urges the levers 13 so that they fulcrum about their points of engagement with the fulcrum ring 22. The leverage thus exerted on the pressure ring 8 forces the clutch member 5 with the cooperating friction rings 7 and 9 into clutching engagement with the member 6, whereby the driven element or shaft 2 is driven from the driving element 1. As the clutch parts wear, the expanding bolt 27 may be loosened to release the ring 22, whereupon said ring may be rotated with respect to the clutch members and, by the coaction of its cam surfaces, provided by the inclined edges 23, with the studs 24, said ring 22 will be moved axially inward. Thereby the points of engagement of the fulcrum portions 21 with said ring 22 will be adjusted axially of the clutch members and thereafter the operation of said levers 13 will effect movement of the pressure ring 8 further to the left as viewed in Fig. 1. When the proper adjustment has been obtained, the expanding bolt may be tightened to clamp the ring 22 in locking engagement with the driving element.

In the form shown in Figs. 1 and 4 the spider 28 is attached to the driving element by bolts 31 which are separate and distinct from the studs 24 which coact with the adjustable ring 22. A single set of bolts, however, may be used both for attaching the spider 28 and for coaction with the adjustable fulcrum ring 22. Such an arrangement is shown in Fig. 2 wherein each arm 30 of the spider 28 is provided with an inwardly directed flange 34 through which extends a bolt 35 into the peripheral wall of the driving element. Said bolts 35 are positioned opposite the fulcrum portions 21 of the levers 13 and operate as abutments for coaction with the inclined edges 23 on the fulcrum ring 22.

While the clutch shown in Fig. 1 is of the single disk type, the invention is equally applicable to clutches of the multiple disk type. In the form shown in Fig. 3, clutch-actuating means of the type illustrated in Fig. 1 are employed in conjunction with a multiple disk clutch, the cooperating clutch members comprising a plurality of disks 36 which are keyed or otherwise suitably attached to the clutch member 5 and cooperate with one or more disks 37 which are keyed or otherwise suitably mounted for rotation with the driving element 1. In the form shown, said disk or disks 37 are provided with one or more peripheral apertures, and one or more pins 38 carried by the pressure ring 8 project into said apertures and cause said pressure ring and disks 37 to rotate as a unit. As the pressure ring 8 is keyed to the driving element by pins 11, it will be perceived that said disk or disks 37 are connected for rotation with said driving element 1. Friction rings 39 are preferably interposed between the disks 36 and 37 as well as between said disks and the pressure ring 8 and clutch member 6, said friction rings 39 being desirably riveted to the disks 36.

While adjustment of the fulcrum ring 22 may be effected by the coaction of inclined edges on the said ring with studs 24 as illustrated in Fig. 5, said ring may be provided with inclined slots 40 as illustrated in Fig. 6 for coaction with studs 41 projecting through said slots into the wall of the driving element. Adjustment of said fulcrum ring is effected in the form shown in Fig. 6 in substantially the same way as in the form shown in Figs. 1 and 5.

While an expanding bolt arrangement has been described for clamping the fulcrum ring in adjusted position, any other suitable means may be provided for accomplishing this purpose. In the form shown in Fig. 7 the fulcrum ring 22 is clamped in adjusted position by angle-shaped clamping members 42 which engage said ring 22 and, by firmly screwing up the studs 24, firmly clamp said ring 22 in engagement with the wall of the driving element.

In the arrangements heretofore described the axial adjustment of the fulcrum points of the levers 13 is effected by bodily axial displacement of the fulcrum ring 22. Such is not essential to the present invention, however, as such adjustment of the fulcrum points of said levers may be effected by a rotatable but axially-non-displaceable ring as shown in Figs. 8 and 9. In the embodiment of the invention here illustrated, the fulcrum ring 22 is provided at its inner edge with as many inclined surfaces 43 as there are clutch actuating levers 13, said inclined edges 43 being in engagement with the fulcrum portions 21 of said levers 13 and operative to adjust the fulcrum points of said levers by the relative rotation of said ring with respect to the clutch members. In the form shown the ring 22 is provided with a radial flange 44 in which are a plurality of slots 45, and bolts 46 project through said slots 45 into the wall of the driving element and clamp said ring 22 in adjusted position.

In the embodiments of the invention so far described the clutch actuating levers 13 are pivoted on the pressure ring 8 and fulcrum against the adjustable ring 22. In the form shown in Fig. 10 the clutch actuating levers 47 are pivoted on an axially movable ring 48 which has a sliding fit in the bore of the recess 3, said levers 47 being provided with fulcrum projections 49 which engage the radial surface of the pressure ring 8, said fulcrum projections being shown as engaging in radial grooves 49' in said ring to prevent relative rotation between said levers and ring. Ring 48 is adjusted axially by its coaction with a rotatable adjustable ring 50 which is shown as clamped in adjusted position by angle pieces 42 of the type shown in Fig. 7. Said ring 50 is provided with cam surfaces for coaction with the studs 24 whereby rotatable adjustment of said ring 50 effects axial displacement thereof to correspondingly move the ring 48 to compensate for wear of the clutch parts.

In the structure shown in Figs. 11 and 12 a modified arrangement is illustrated for effecting rotation of the driving disks of a multiple disk clutch from the driving element 1. As here shown, the disk or disks 37 are keyed or otherwise suitably attached to a channel-shaped key member 51 to which is suitably attached, as by riveting, a channel-shaped pressure ring 52. The heads of the pin or pins 11 engage within the channel 53 of the key member 51 and positively drive said key member 51, together with the pressure ring 52 and the disk or disks 37, from the driving element 1.

The form shown in Figs. 13 and 14 illustrates one manner by which the fulcrum ring may be mounted and retained in adjusted position by posts or brackets extending from the fly wheel or other driving element. In this arrangement a plurality of posts or brackets 54, preferably of the same number as the clutch-actuating levers 13, are suitably mounted on the driving element 1, as by bolts 55 extending through flanges 56 into said driving element. Each of said posts has an axial slot 57 in which is received the adjustable fulcrum ring 22, shown as of the type illustrated in Figs. 1 and 5 and provided with axially inclined cam edges 23. Said fulcrum ring 22 is retained in said slots 57 by bolts 58 extending through the outer leaf-like portion 59 and threaded into the body portion 60 of each post. Each post is also radially slotted or recessed as shown at 61 so that the fulcrum portions 21 of the levers 13 may engage the edge of the ring 22 opposite the respective bolts 58. The pressure ring 8 may be keyed to rotate with the driving element 1 by bolts 62 threaded into the respective posts and, when a spider 28 is employed, said spider may be attached to the posts 54, as by bolts 63. In this arrangement, the clutch-actuating levers 13 fulcrum against the edge of the ring 22 and their fulcrum points may be adjusted by rotation of said ring substantially as described in connection with the embodiment shown in Figs. 1 and 5, while said ring 22 is retained in adjusted position by tightening the bolts 58 to clamp said ring between the leaf-like portions 59 and the body portions 60 of said posts.

It will therefore be perceived that a clutch has been provided which is composed of a minimum number of simple parts whereby expensive and complicated forgings and castings are avoided and whereby simple forgings and stampings may be employed without the use of highly skilled labor or expensive machining. Moreover, the adjusting device for the clutch-actuating means is mounted directly on one of the driving and driven elements so as to be independent of any cover or closure member for the clutch parts. At the same time, the open formation of the construction insures a circulation of air through the clutch parts, with a consequent cooling thereof. Also, cleaning of the clutch by blowing or washing out its parts is facilitated, and said parts may be inspected and adjusted at any time without removal of a cover or other clutch elements. Furthermore, the clutch is light and simple in construction so that balancing is easily effected while, at the same time, it is strong and durable as the stresses are sustained by parts that are not likely to be broken. A clutch constructed in accordance with the present invention possesses the further advantages that it is inexpensive to manufacture, easy to assemble and efficient in operation.

While the embodiments of the invention illustrated on the drawings have been described with considerable particularity, it is to be expressly understood that the invention is not limited thereto. Thus, it is to be expressly understood that cooperating clutch members of the multiple disk type may be employed interchangeably with clutch members of the single disk type in various embodiments; furthermore, the constructions illustrated for effecting axial adjustment of the fulcrum points of the clutch-actuating levers and for clamping the adjustable ring in adjusted position may be employed interchangeably in various embodiments. Certain features may also be used without other features and changes may be made in the details of construction and arrangement without departing from the spirit of this invention. Reference is therefore to be had to the claims hereto appended for a definition of the limits of the invention.

What we claim is:

1. In a clutch, the combination with driving and driven elements having cooperating clutch members, of clutch-actuating means comprising a plurality of levers for operating said clutch members, means for adjusting said levers axially of said clutch members comprising a ring directly mounted on one of said elements, said ring being rotatable on said element independently of said levers and having cam surfaces, and studs on said element coacting with said cam surfaces to effect axial displacement of said ring upon rotation thereof.

2. In a clutch, the combination with driving and driven elements having cooperating clutch members, of clutch-actuating means comprising a plurality of levers for operating said clutch members, means pivotally mounting said levers, a closure member for said clutch members, a fulcrum member for said levers mounted independently of said closure member on the opposite side of said levers from said clutch members, and means coacting with said fulcrum member for adjusting the fulcrum points of said levers.

3. In a clutch, the combination with driving and driven elements having cooperating clutch members, of clutch-actuating means comprising a plurality of levers for operating said clutch members, a closure member for said clutch members, a ring mounted independently of said closure member, and means coacting with said ring to provide adjustment of the fulcrums of said levers by the rotation of said ring with respect to said levers.

4. In a clutch, the combination with driving and driven elements having cooperating clutch members, of clutch-actuating means comprising a plurality of levers for operating said clutch members, a closure member for said clutch members, a fulcrum ring for said levers mounted independently of said closure member, and means whereby rotation of said fulcrum ring with respect to said levers takes up the wear of said clutch members.

5. In a clutch, the combination with driving and driven elements having cooperating clutch members, of clutch actuating means comprising a plurality of levers for operating said clutch members, a closure member for said clutch members, and a ring on which said levers fulcrum mounted independently of said closure member, said ring being mounted on posts secured directly to one of said elements.

6. In a clutch, the combination with driving and driven elements having cooperating clutch members, of clutch actuating means comprising a plurality of levers for operating said clutch members, a closure member for said clutch members, and an adjustable ring on which said levers fulcrum mounted independently of said closure member, said ring being mounted on posts secured directly to one of said elements and movable with respect thereto to adjust said clutch members.

7. In a clutch, the combination of driving and driven elements having cooperating clutch members, one of said elements being provided with a plurality of projections forming brackets, clutch actuating means comprising a plurality of levers for operating said clutch members, and fulcrum means mounted in slots in said brackets.

8. In a clutch, the combination of driving and driven elements having cooperating clutch members, one of said elements being provided with a plurality of axially-extending slotted projections, clutch actuating means comprising a plurality of levers for operating said clutch members, and fulcrum means mounted in the slots of said projections, movement of said fulcrum means with respect to said projections effecting adjustment of said clutch members.

9. In a clutch, the combination of driving and driven elements having cooperating clutch members, one of said elements being provided with a plurality of axially-extending slotted projections, clutch actuating means comprising a plurality of levers for operating said clutch members, fulcrum means mounted in the slots of said projections, and a closure member secured to said projections independently of said fulcrum means.

10. In a clutch, the combination of driving and driven elements having cooperating clutch members, one of said elements being provided with a plurality of axially-extending slotted projections, clutch actuating means comprising a plurality of levers for operating said clutch members, and a fulcrum ring having one or more cam surfaces mounted in the slots of said axially-extending projections.

11. In a clutch, the combination of driving and driven elements having cooperating clutch members, one of said elements being provided with a plurality of axially-extending slotted projections, clutch actuating means comprising a plurality of levers for operating said clutch members, a fulcrum ring having one or more cam surfaces mounted in the slots of said axially-extending projections, and means for securing said ring in any position to which it may be adjusted.

12. In a clutch, the combination with driving and driven elements having cooperating clutch members, of clutch actuating means comprising a plurality of levers for operating said clutch members, a closure member for said clutch members, a ring on which said levers fulcrum mounted independently of said closure member, and posts on one of said elements cooperating with said ring whereby rotation of said ring effects adjustment of said clutch members.

In testimony whereof we have signed this specification.

FRANCIS S. DENNEEN.
COURTNEY N. MITCHELL.